United States Patent [19]

Felstehausen

[11] Patent Number: 4,943,259
[45] Date of Patent: Jul. 24, 1990

[54] CORN CUTTER AND SYSTEM

[75] Inventor: Eugene F. Felstehausen, Hoopeston, Ill.

[73] Assignee: FMC Corporation, Chicago, Ill.

[21] Appl. No.: 222,458

[22] Filed: Jul. 21, 1988

[51] Int. Cl.$^5$ .................................... A01F 11/06
[52] U.S. Cl. .......................... 460/52; 460/56; 460/57
[58] Field of Search .............. 130/9 R, 9 A, 9 B, 9 D, 130/8, 52, 53, 54, 55, 56, 57, 58

[56] References Cited

U.S. PATENT DOCUMENTS

| | | | |
|---|---|---|---|
| 1,282,792 | 10/1918 | Fenn | 460/53 |
| 1,975,574 | 10/1934 | Hansen | 130/9 B |
| 2,214,285 | 9/1940 | Schmidt | 130/9 B |
| 2,323,092 | 6/1943 | Kerr | 460/53 |
| 2,335,594 | 11/1943 | Kerr | 130/9 B |
| 2,577,530 | 12/1951 | Kerr | 130/9 B |
| 3,455,307 | 7/1969 | Ross et al. | 130/9 R |
| 3,625,223 | 12/1971 | Shuler | 130/9 B |
| 3,942,629 | 3/1976 | Cover | 198/383 |
| 4,143,664 | 3/1979 | Chorney | 460/17 |
| 4,413,722 | 11/1983 | Frisbie et al. | 198/392 |

Primary Examiner—Jerome W. Massie
Assistant Examiner—Terry Lee Melius
Attorney, Agent, or Firm—Ronald C. Kamp; R. B. Megley

[57] ABSTRACT

A corn cutter unit in which an ear of corn is propelled by a plurality of feed rollers into a plurality of knives carried by a rotating head, with the knives being adjustable to define an opening through which the cob may pass, and a cob puller having upper and lower chains, each of which is formed of links and driven by sprockets over a guide, which guide has a height substantially equal to the length of the individual chain links to extend through said head and grip the corn cob.

3 Claims, 12 Drawing Sheets

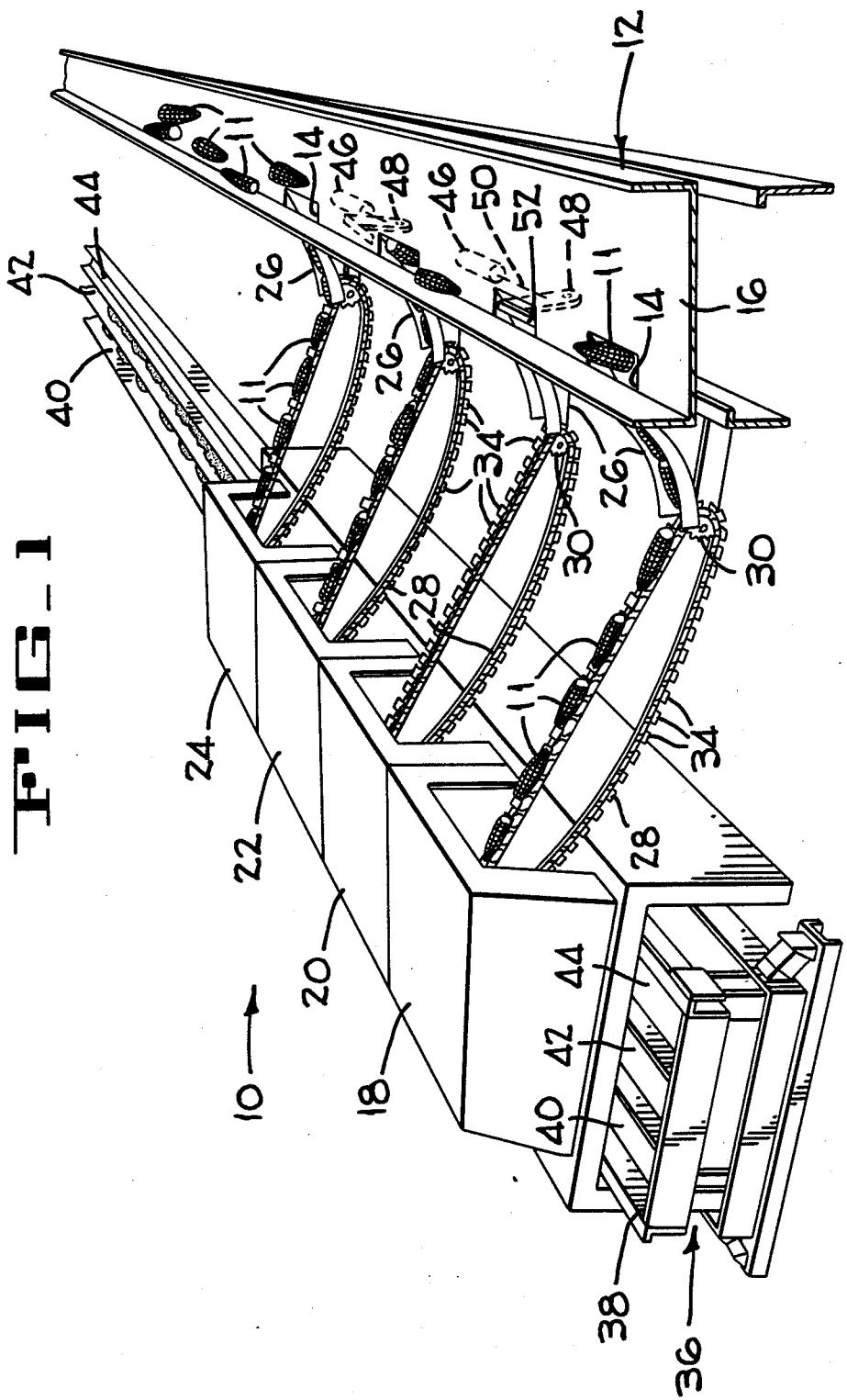

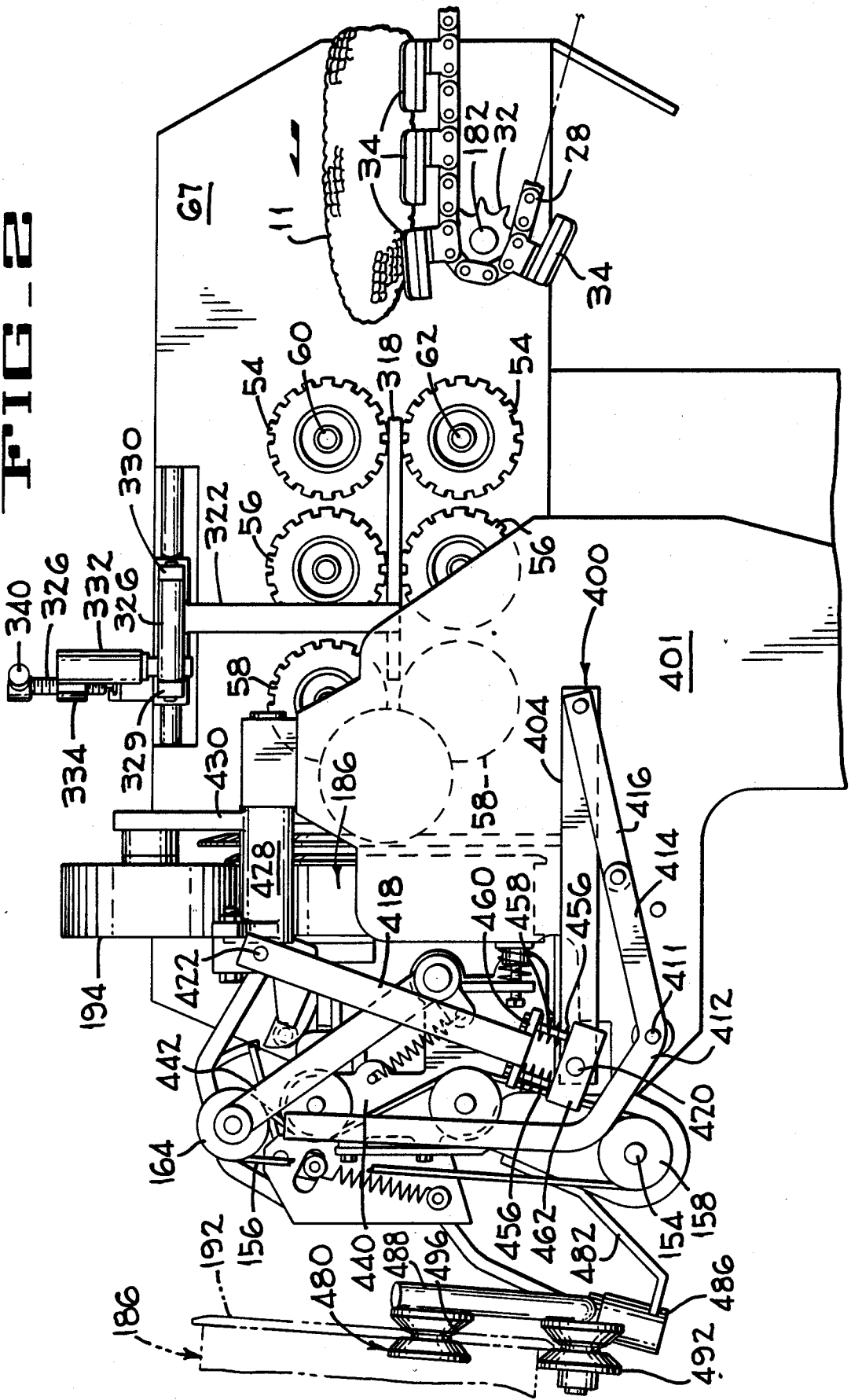

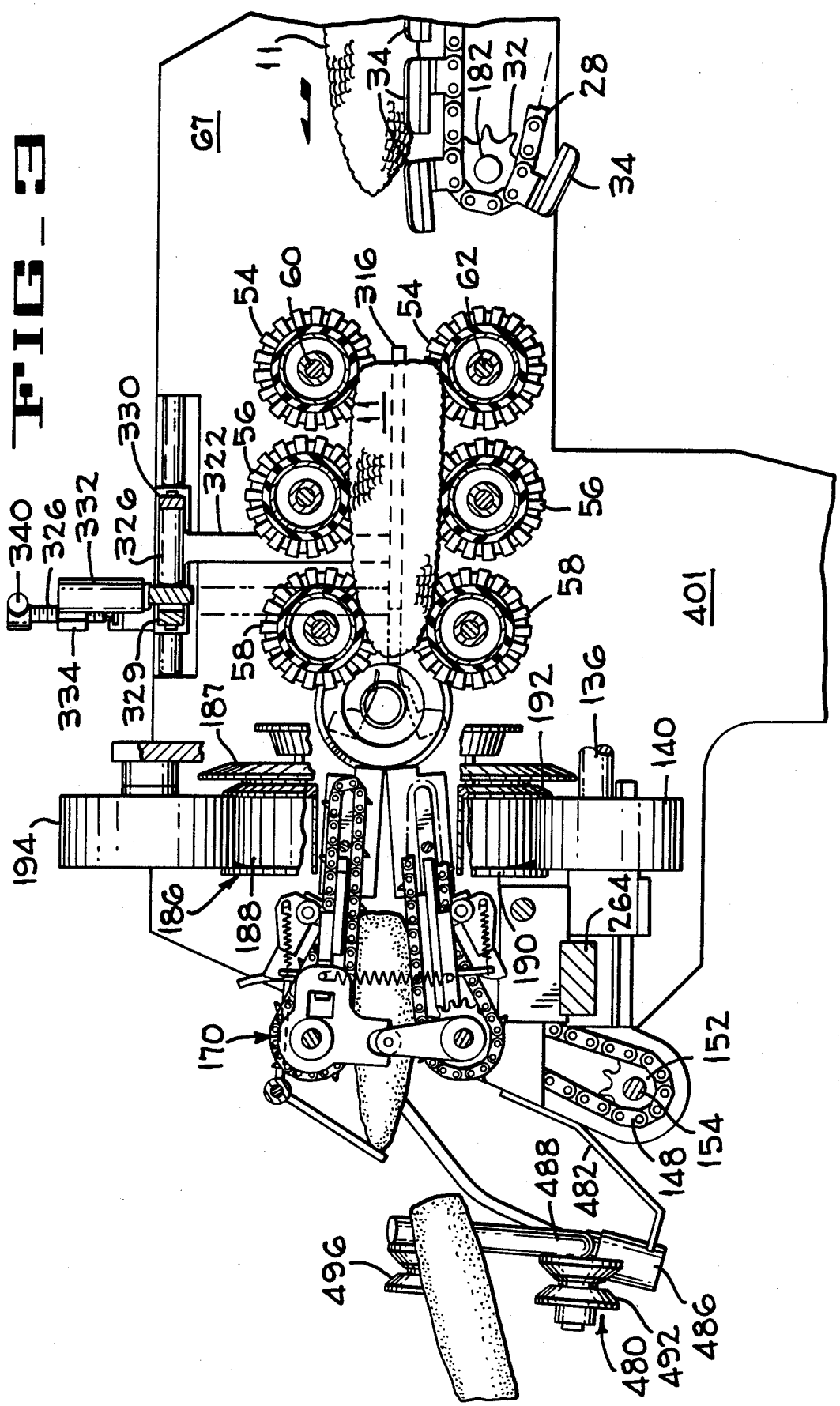
FIG_3

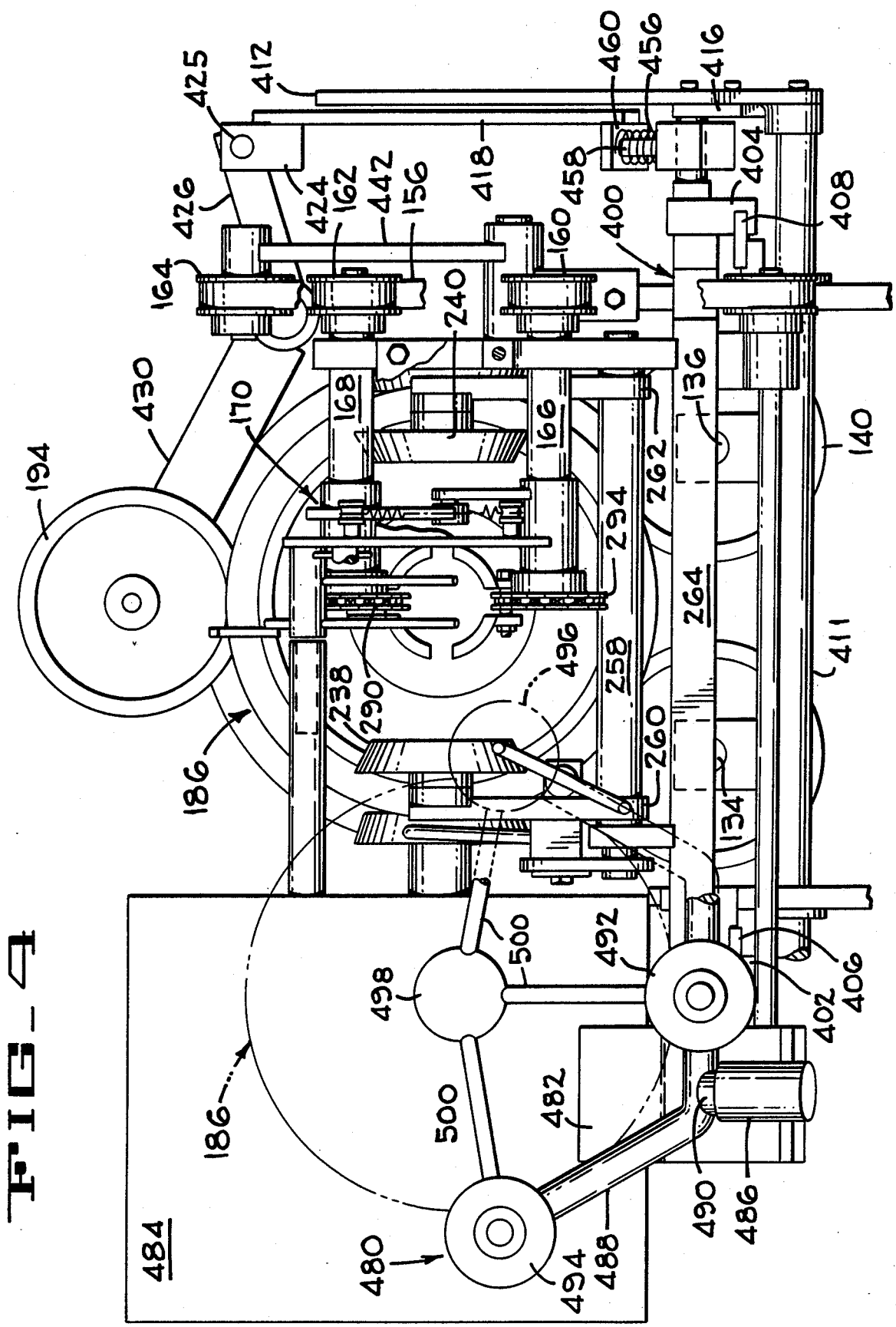

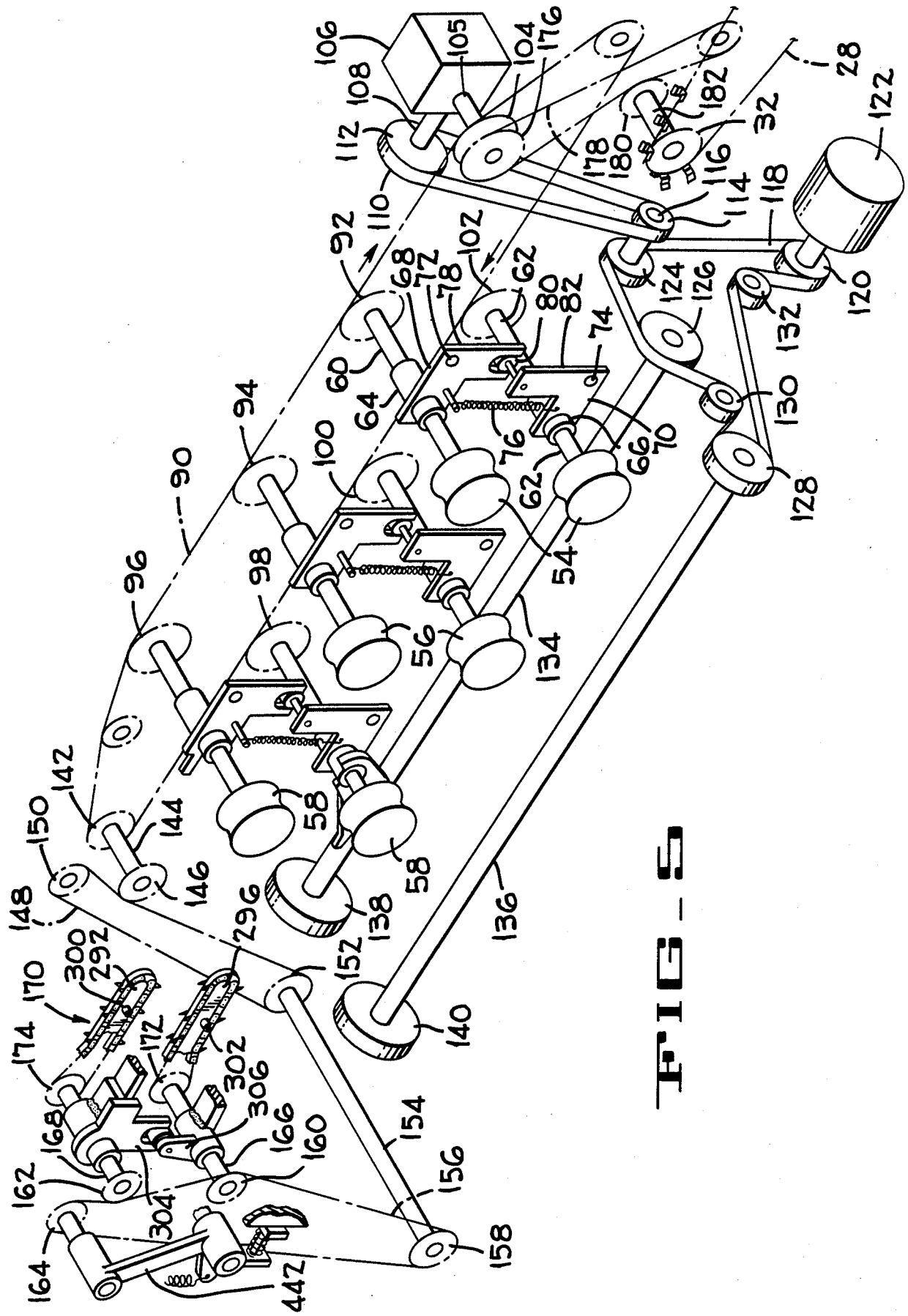
FIG_5

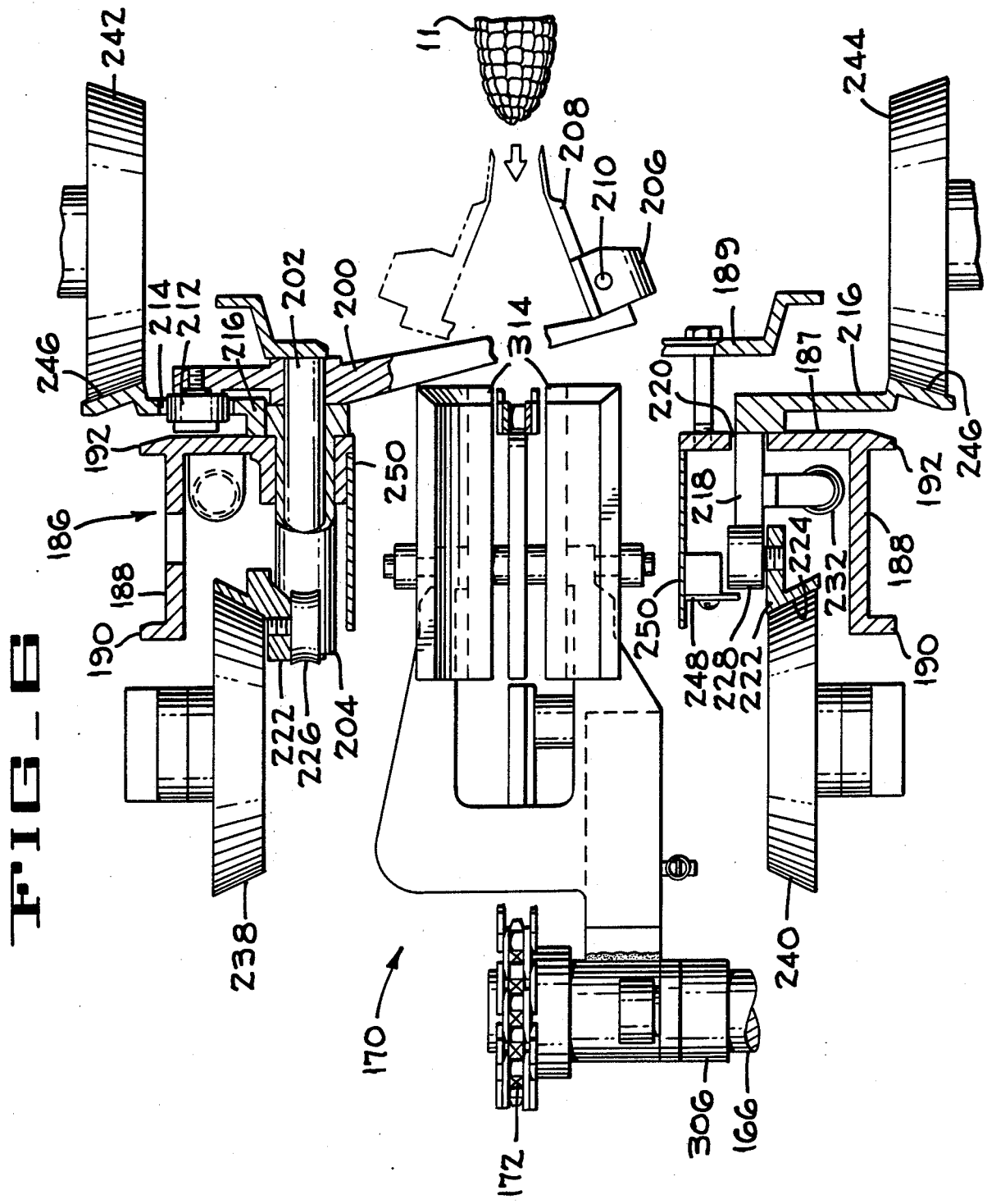

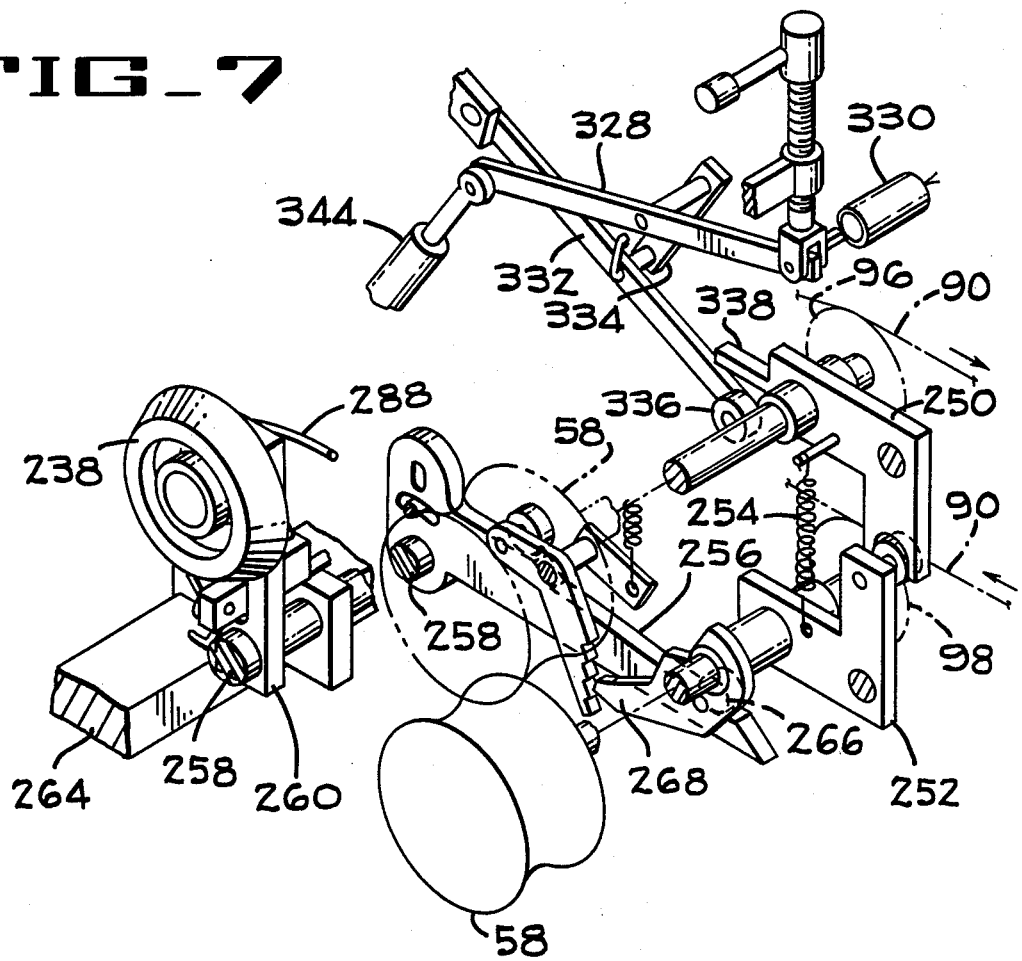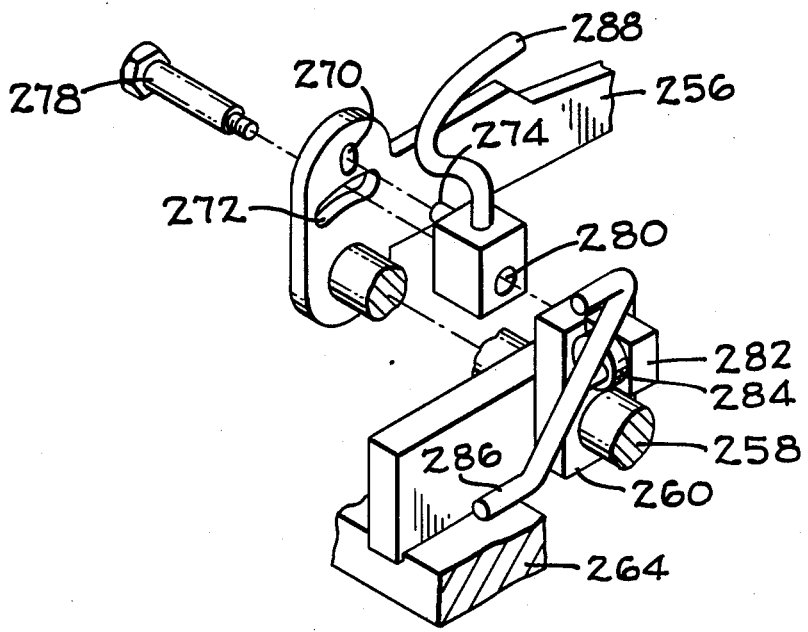

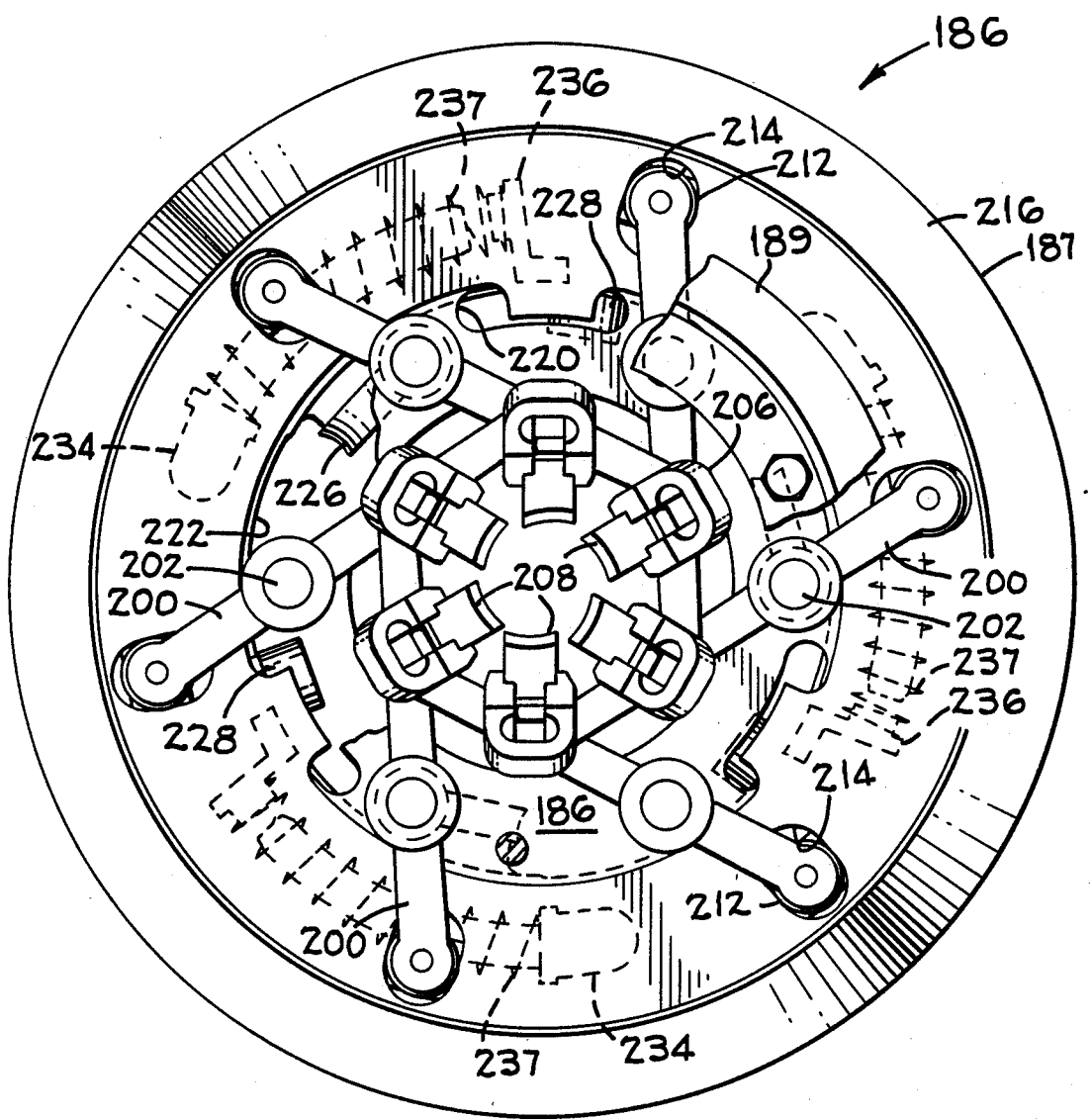
FIG_9

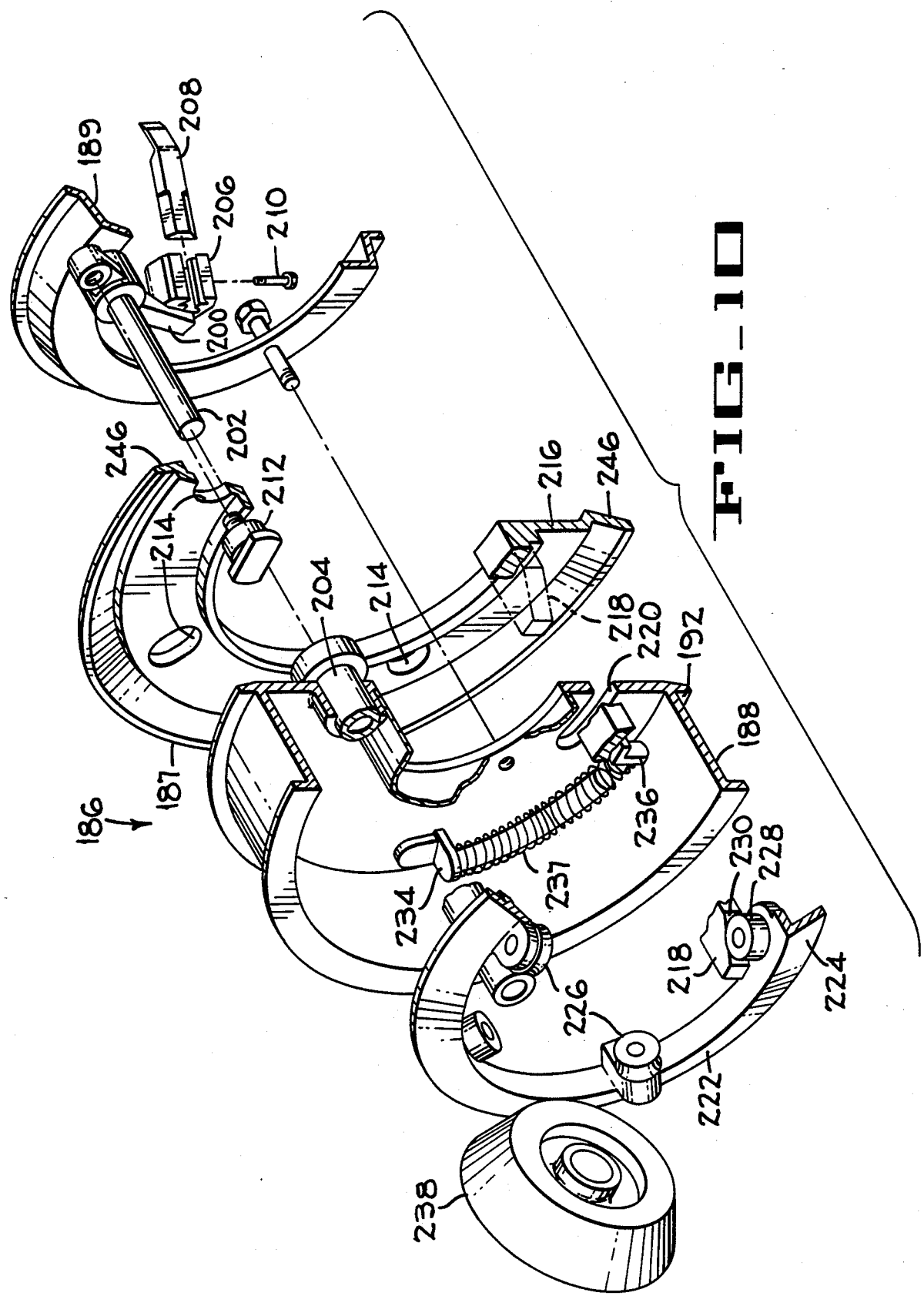

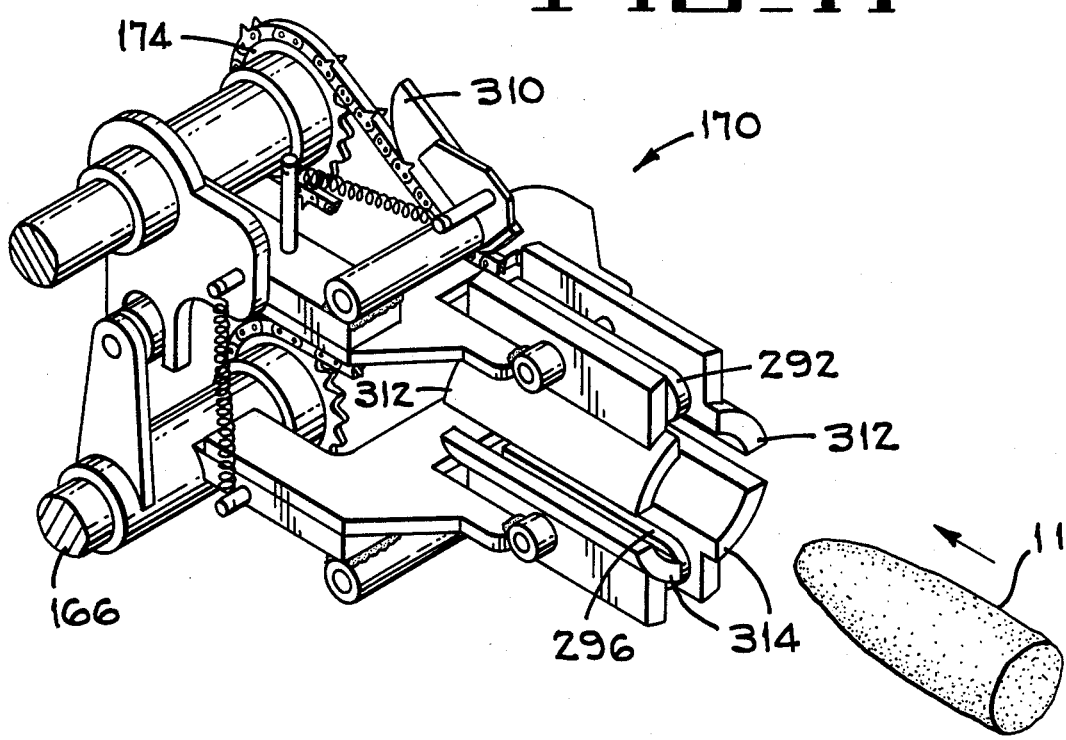
FIG_11
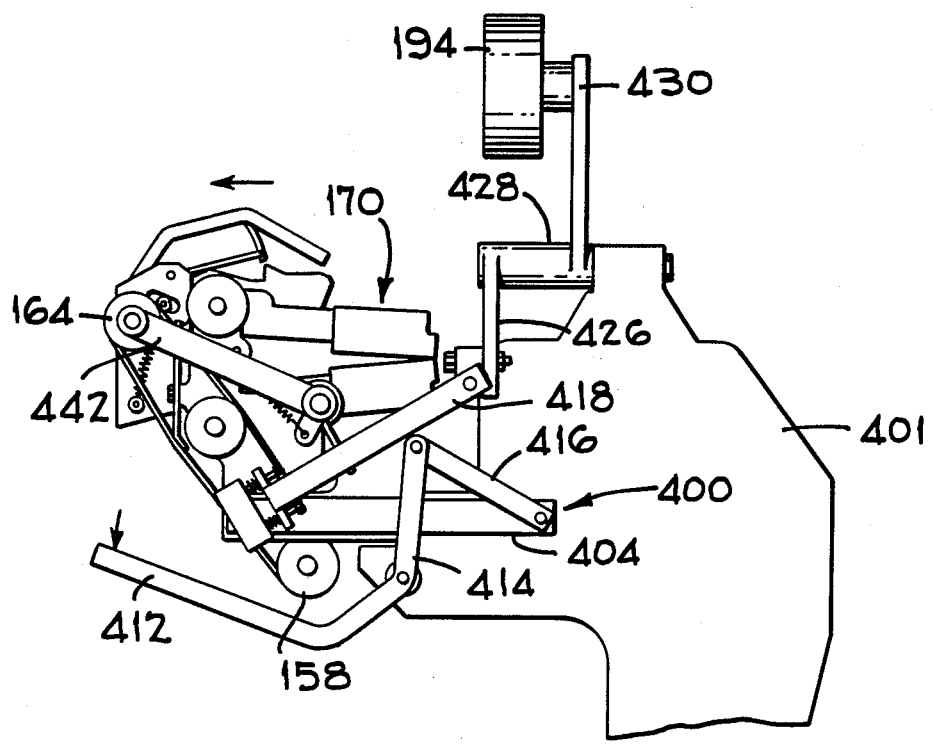
FIG_12

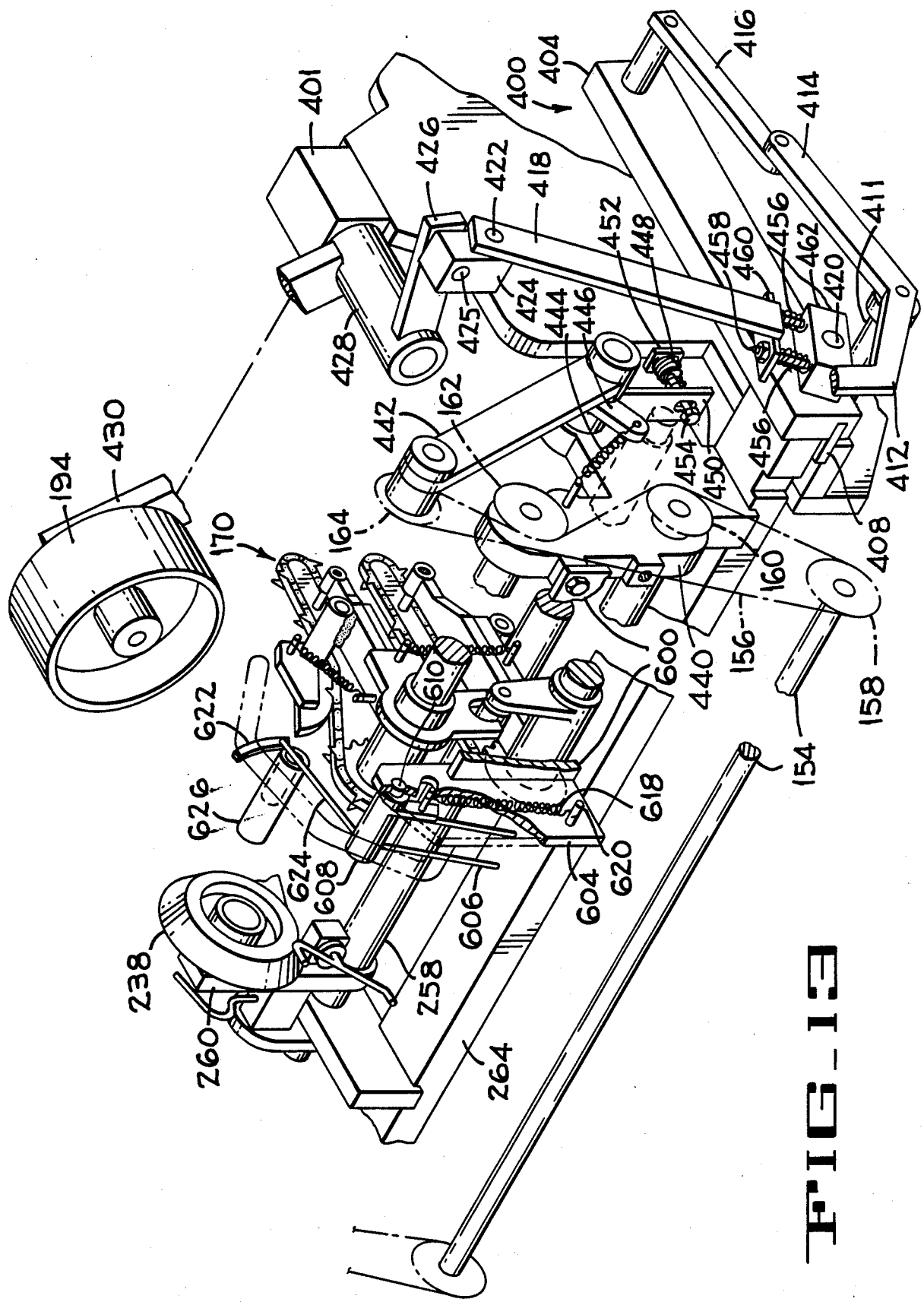
FIG_13

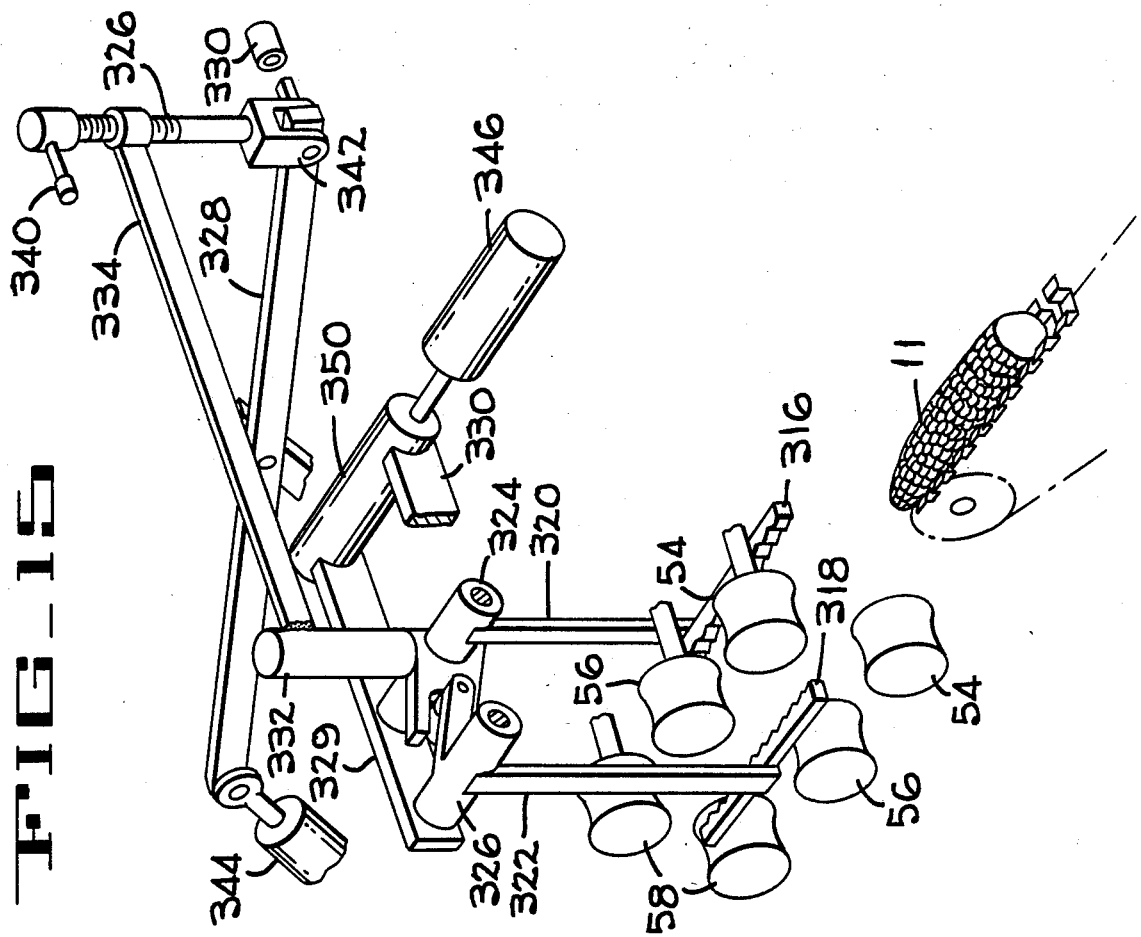
FIG_15
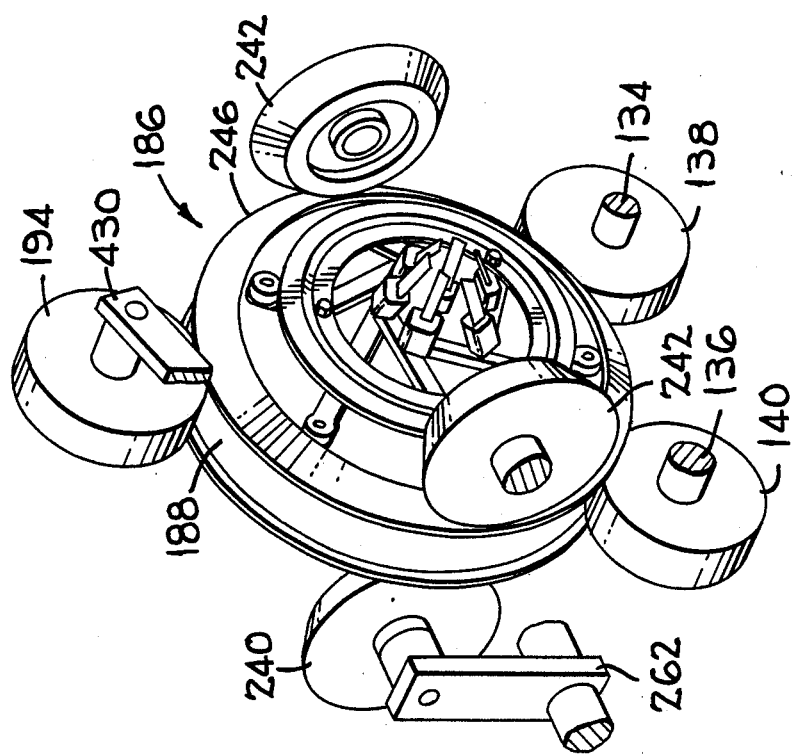
FIG_14

CORN CUTTER AND SYSTEM

This invention relates to sweet corn cutters generally and more particularly to such cutters and their associated systems which utilize a plurality of rotating knives to cut the kernels from the cob on an ear of sweet corn.

The prior corn cutters have required the ears of corn to be oriented in a particular direction as the ears are fed into the cutter mechanism, necessitating an additional piece of equipment in the system upstream of the cutter to detect the orientation of each individual ear of corn and then, with respect to those ears not oriented properly, either turn them to the proper orientation or remove them from the stream of ears being transported to the cutter. The additional mechanism has added to the cost and complexity of the system and detracted from the operating efficiency thereof.

The present invention provides a corn cutter and system which is capable of accepting a rapid succession of ears of corn without regard to the orientation of the individual ears, resulting in a more efficient system; which is capable of detecting and automatically reacting to clear a jam at the cutter head; which provides an active, powered means for clearing a jam; which incorporates an improved cob puller arrangement, to reduce the possibility of jams occurring; which adjusts the knives carried by the cutter head while it is operating with a force which is not dependent on the rotational speed of the head; which permits quick and easy removal of the cutter head for cleaning and service; and which may be operated in a total system at high speed and with efficiency.

These and other attributes of the present invention, and many of the attendant advantages thereof, will become more readily apparent upon a perusal of the following detailed description of a preferred embodiment and the accompanying drawings, wherein:

FIG. 1 is a perspective view of a corn cutter system according to the present invention;

FIG. 2 is a side elevation view from the right side, with portions of the housing and shielding broken away or eliminated for clarity, of a single cutter unit utilized in the system of FIG. 1;

FIG. 3 is a cross-sectional view of the unit shown in FIG. 2 taken on a vertical plane through the center of the unit;

FIG. 4 is a front end view, with portions broken away for clarity, of the unit shown in FIG. 2;

FIG. 5 is a schematic representation of the unit shown in FIG. 1;

FIG. 6 is a top plan view of a portion of the unit of FIG. 2 illustrating the cutter head and cob puller arrangement;

FIG. 7 is a schematic representation of the mechanism for adjusting the knives on the cutter head;

FIG. 8 is a detailed pictorial view of the present adjustment for the knives;

FIG. 9 is a view of the cutter head from the knife side;

FIG. 10 is an expanded view, partially in sections, of a portion of the cutter head;

FIG. 11 is a pictorial view of the cob puller;

FIG. 12 is a side elevational view of the mechanism to release the cutter head;

FIG. 13 is a pictorial view of the release mechanism illustrated in FIG. 12;

FIG. 14 is a pictorial view of the cutter head shown the knife adjustment and drive means therefor; and FIG. 15 is a pictorial view of the cob pusher mechanism; and Referring now to FIG. 1, there is shown a corn cutter system, indicated generally at 10, which includes a vibratory conveyor 12, which may be of the type manufactured by FMC Corporation's Material Handling Equipment Division and identified as their model BL1806M. Ears of corn 11 from which the shucks have been removed are fed to the conveyor at some point in the distance and are moved by the conveyor 12 toward the foreground. The conveyor 12 is tilted slightly so that the ears tend to move toward the left side of the conveyor. A plurality of openings 14, sized to allow a single ear of corn to readily drop through, are provided in the bottom of the conveyor trough 16 along the left side thereof. One opening is provided for each cutter unit used in the system; as illustrated in FIG. 1, there are four cutter units 18, 20, 22, and 24 and hence four openings 14. A curved chute 26 is aligned with each opening 14 to receive the ears of corn 11 as they drop through the openings. The chute 26 turns the ears 11 as they slide down the chute so the longitudinal axis of the ear is aligned with a chain 28 trained over an idler sprocket 30 and a driven sprocket 32 within each cutter's unit. (See FIG. 2.). An arcuate cradle member 34 is attached to or formed on the chain 28 and functions to support the ears 11. The chain 28 and cradle members 34 function as a feed conveyor for delivering a stream of corn ears to each of the cutter units 18, 20, 22 and 24. A conveyor 36, which may be a vibratory conveyor of the type manufactured and sold by FMC Corporation's Material Handling Equipment Division as their model BL1400M, is positioned below, and extends along the cutter units. The trough 38 is compartmentalized to receive from the cutter units and convey the cobs in one compartment 40, the cut corn kernels in the middle compartment 42, and rejected ears, i.e., ears from which the kernels have not been cut, in compartment 44. Another conveyor, not shown but downstream of the cutter units, returns the ears in compartment 44 to the cutter units by elevating them from compartment 44 to the trough 16. In case one of the cutter units jams or is out of service, a cylinder 46 is actuated to pivot an arm 48. When the rod 50 of the cylinder 46 is extended, a bar 52 affixed to the arm 48 is positioned in the associated opening 14 to block ears 11 from falling therethrough. Retraction at the rod 50 will pivot the ar 48 removing the bar 52 from the opening 14.

Referring now to FIGS. 2 and 3, the chain 28 transports the ears 11 to three sets of feed rollers 54, 56 and 58. Each of the feed rollers is formed with a concave contour, to roughly match the radius of the ear, and are toothed and made of a relatively soft material, such as polyurethane, to grip the ear and drive it to the left as viewed in FIGS. 1 and 2. The shafts 60 and 62 to which the feed rollers 54 are affixed are mounted in bearings 64 and 66 respectively, which bearings are in turn affixed to one arm of bell cranks 68 and 70 respectively, as best seen in FIG. 5. The bearings 64 and 66 ar positioned in vertical slots (not shown) of a sheet metal side member 67 so that the rollers 54 may move vertically. The bell cranks 68 and 70 are pivotally supported at 72 and 74 respectively and are biased toward each other by tension spring 76; which spring also normally holds the bearing 64 at the bottom of its associated slot and the bearing 66 at the top of its associated slot. The downward extending arm 78 of bell crank 68 is bifurcated to accept a roller 80 mounted on the upward extending arm 82 of bell crank 70. Thus, the ears of corn will be forced to the middle or vertical center between the rollers 54 since any movement toward either the upper or lower roller 54 will result in the bell cranks 68 and 70 exerting a force through the spring 76 to restore the ear to the center vertically of the rollers 54. Similar mechanisms are provided for the rollers 56 and 58.

The drive for the feed rollers 54. 56 and 58 is provided by a chain 90 (see FIG. 5) trained over sprockets 92, 94, and 96 attached to the shafts mounting the upper feed rollers and over sprockets 98, 100, and 102 attached to the shafts mounting the lower feed rollers. The chain is driven by a drive sprocket 104 affixed to the output shaft 105 of a right angle gear reducer 106. The input shaft 108 to the reducer 106 is powered by a belt 110 wound over the pulley 112 attached to input shaft 108 and a pulley 114 affixed to a jack shaft 116. The jack shaft 116 is powered by a belt 118 trained around a drive pulley 120 driven by an electric motor 122, a pulley 124 attached to jack shaft 116, and around cutter head drive pulley 126 and 128. Idler pulleys 130 and 132 are provided to assure sufficient tension on the belt 118 as well as wrap on pulleys 126, 128 and 120 to preclude slippage. The pulleys 126 and 128 are attached to the rearward ends of shafts 134 and 136 respectively which shafts have cutter head drive rollers 138 and 140 respectively mounted on their forward ends. The rollers 138 and 140 support and rotationally drive the cutter head in a manner to be described hereinafter. The chain 90 also is trained around and drives a sprocket 142 on jack shaft 144 to which a sprocket 146 is also attached. The sprocket 146 engages and drives a chain 148 trained around an idler sprocket 150 and a sprocket 152 attached to one end of a cross shaft 154. A cogged belt 156 drivingly engages a pulley 158, attached to the other end the cantilevered cross shaft 154, the pulleys 160 and 162 and an idler pulley 164. Idler pulley 164 also functions as a tension and release means for the belt 156 in connection with a carriage and release means to be described hereinafter. The pulleys 160 and 162 are mounted on shafts 166 and 168 which respectively drive the cob puller, indicated generally at 170, through sprockets 172 and 174. A second sprocket 176 on the output shaft 105 drives a chain 178 which engages a sprocket 180 attached to a jack shaft 182 to which the sprocket 32 is also attached. Thus, one motor 122 powers all of the components of one cutter unit which assures that the synchronization and relative speeds thereof are always correct and also readily permits a reversal of direction of all such components when needed, as will be explained hereafter.

As shown in FIG. 3, the cutter head 186 has a housing 187 with cylindrical body 188 including radially extending front and rear flanges 190 and 192. The axial length of the body 188, i.e., the distance between the flanges 190 and 192, is slightly greater than the axial width of the drive rollers 138 and 140, so that the body 188 may engage the rollers 138 and 140, be supported thereby and also retained by the flanges 190 and 192 in position over the drive rollers 138 and 140. The aforementioned greater axial length of the body is necessary to permit the head 186 to be easily positioned on and removed from the rollers 138 and 140. A pressure roller 194, which is unpowered but freely rotatable, is positioned above the cutter head 186 and engages the body 188 and is spring biased, as explained hereinafter, toward the cutter head 186 to provide the normal force necessary for the friction drive between the rollers 138 and 140 and the body 188. As seen in FIGS. 9 and 10, six knife arms 200 are each pivotally mounted by an integral stud 202 in a hub 204 carried by the housing 187. The arms are held in place by a retainer ring 205 bolted to the housing 187. A knife holder 206 is secured to each of the arms 200 at the end thereof adjacent to the center of the head 186. A knife 208 is releasably secured in each of the holders 206 by a bolt 210. The outer end of each arm 200 has a roller 212 attached thereto, which roller is trapped within a radial slot 214 formed in a knife control ring 216. Three angular shift cams 218 are attached to the control ring 216 and each projects through an associated circumferential slot 220 in the housing 187. An adjusting cam 222 comprising a circular ring with a frustro-conical surface 224 is supported within the housing 187 by three equiangular spaced, concave rollers 126 each of which are rotatably secured to the cam 222 and ride on one of the hubs 204. Three actuating rollers 228 are rotatable mounted on the cam 222 and engage the ramp 230 of the cam 218. Thus, when the cam 222 is moved axially toward the housing 187, the rollers 228 are forced against the ramps 230 and cause the knife control ring 216 to shift angularly with respect to the housing 187. This angular displacement of the ring 216 will cause the rollers 212 to rotate the arms 200 about the studs 202 and thereby open the knives 208, i.e., increase the diameter of the opening defined by the knives. A compression spring 232 is trapped between a bracket 234 secured to the housing 187 and a bracket 236 secured to the cam 218 urges the knife control ring 216 to a position wherein the knives define a minimum diameter opening. The spring 232, acting through the ramp 230 and the rollers 228 also urges the control cam 222 outward away from the housing 187. A pair of conical control wheels 238 and 240 engage the surface 224 and control the position of the cam 222 relative to the housing 187 and hence the diameter of the opening defined by the knives 208. The axial forces exerted on the head 186 by the control wheels 238 and 240 are balanced by opposing forces exerted by conical idler wheels 242 and 244 on a frustro-conical surface 246 formed on the knife control ring 216. The adjusting cam 222 is retained with the head 186 when it is removed from the cutter unit by retainer clips 248 secured to a cylindrical hub 250 secured to the housing 187. The clips 248 project radially to contact the rollers 228 and prevent the ca 222 from separating from the head 186.

The control wheels 238 and 240 are in turn controlled by the movement of the rollers 58. i.e., the amount of separation therebetween as determined by the diameter of the ear of corn as it passes through the rollers 58. As shown in FIG. 7, the upper and lower rollers 58 are journaled in bell cranks 250 and 252 respectively. One of the adjacent arm of the bell cranks is bifurcated to accept a roller rotatably mounted on the other of the adjacent arms, and a tension spring 254 extends between the other arms of the bell cranks. Thus an ear of corn will be centered by the bell crank arrangement, which assures that the movement of the rollers 58 will be equal and opposite to each other. The movement of the rollers 58 is translated to adjustment of the knives 208 by an actuating arm 256 which is rotatably mounted on a shaft 258. The control wheels 238 and 240 are rotatably mounted on upright plates 260 and 262 respectively affixed to the shaft 258, which shaft is itself rotatably supported from a cross-member 264 of the carriage. The arm 256 may be adjustably locked to the plate 260 and when so locked, rotation of the arm 256 on the shaft 258 will rotate the plate 260 and hence the shaft and plate 262. An ear of corn passing between the rollers 58 will cause the bell cranks 250 and 252 to pivot away from each other and a roller 266, which is rotatably carried by a pawl 268 rigidly secured to the bell crank 252, to depress the arm 256. The downward movement of the arm 256, as viewed in FIG. 7, will cause the control wheels 238 and 240 to push the adjusting cam 222 to the right, as viewed in FIG. 6. The amount of movement of the control wheels 238 and 240, and hence the opening of the knives, is directly related to the separation of the rollers 58 at any point in time as the ear 11 passes between the rollers. Since some varieties of corn have cobs of a greater diameter, an adjustment to preset the knife opening is provided. That adjustment, i.e., the aforementioned adjustable lock between the arm 256 and the plate 260, is illustrated in FIG. 8. The arm 256 is provided with a vertical slot 270 and an arcuate slot 272. A pin 274 is attached to a block 276 and extends into the slot 270. A bolt 278 extends through the slot 272, a hole 280 in the block 276, a hole (not shown) in the plate 260 and is threaded into a block 282. An eccentric 284 is rotatably mounted on the block 282 and engages the plate 260. When the eccentric 284 is tightened, which may be readily facilitated by attached handle 286, against the plate 260, the bolt 278 draws the arm 256 and the block 280 into tight engagement with the plate 260 so that they rotate as a unit. Loosening the eccentric 284 with the handle 286 will permit the plates 260 and 262 to be angled relative to the arm 256. A handle 288 on the block 276 facilitates this relative movement. Pushing forward on the handle 288 will pivot the plates 260 and 262 to open the knives 208 and pulling on the handle will close the knives 208. Once the desired initial knife setting has been achieved, the handle 288 is held is position while the handle 286 is turned to wedge the eccentric 284 against the plate 260 and thereby lock the arm 256 to the plate 260.

While the three sets of feed rollers are pushing the ear 11 into the whirling knives 208, a cob puller 120 is provided to grab and pull cob 211. The cob puller 170 has an upper chain 290 trained over the pulley 174 and around a plastic slide 292. Similarly, a lower chain 294 is wound on sprocket 172 and a plastic slide 296. Both of the chains 290 and 294 include links with outward projecting spikes 298 for gripping the cob and facilitate pulling the ear through the knives 208. The slides 292 and 296 are pinned by pins 300 and 302 respectively to a pair of bell cranks 304 and 306 journaled on the shafts 166 and 168. These bell cranks are biased together by a tension spring 308 and assure equal movement of the slides 292 and 296 through a bifurcated end and cooperating roller in a manner similar to that described previously. The upper and lower chains 290 and 294 are positioned in line with the knives and extend into the head 186, whereby the end of the cob from which corn has been cut may be grabbed to exert a pulling force thereon while the ear is still being pushed by at least the last pair of feed rollers 58. Chain guides 310 pivotally carried by the bell cranks 304 and 306 are biased against the chains 290 and 294 to urge these chains into engagement against the slides 292 and 296 to insure a low profile and as deep a penetration of the chains into the head 186 as possible within interferring therewith. Two cob guide means 312 comprising a semi-cylindrical guide are secured on each side of the upper slide 292 and two similar cob guide means 314 are secured to the lower slide 296; the semi-cylindrical guides forming a cylindrical channel to insure engagement of the chains with the cob and to guide the travel of the cob through, and discharge thereof from, the cob puller.

The jam detector and mechanism is shown in FIGS. 7 and 15. A pair of side grippers 316 and 318 are positioned between the upper and lower feed rollers 54, 56 and 58 and attached to arms 320 and 322 respectively of bell cranks 324 and 326 pivotally supported between cross members 329 and 330. The adjacent arms of the bell cranks are interconnected by a roller and fork arrangement to assure equiangular displacement of the arms 320 and 322. When a jam occurs. i.e., an ear of corn does not pass through the rotating knives 208, the following ear which is also being propelled toward the cutter head 186 will push at least one of the grippers to the side. Regardless, of which gripper is pushed, the fork and roller interconnection of the bell cranks will pivot the extension 332 formed on the bell crank 324 in a clockwise direction, as viewed in FIG. 15. The remote end of an arm 334 attached to the extension will be elevated. An adjusting screw 326 will pull upon the right end of a cylinder lever 328. A sensor 330 will detect this movement and signal a jam to a microprocessor. The upward movement of the level 328 will be transmitted to a lever 332, which is pivoted at its left end, through a link 334 pinned between the two levers 328 and 332. The right end of lever 332 will be elevated causing a roller 336 to exert an upward force on a projection 338 on the bell crank 250, causing this bell crank to rotate clockwise and the bell crank 252 to rotate an equal amount in a counterclockwise direction. The roller 266 will depress the arm 256. The control wheels 238 and 240 will push on the control cam 222 to open the knives. The sensitivity of the jam detector may be adjusted by the initial separation between the grips 316 and 318. Turning the adjusting screw with handle 340 will cause the remote threaded end of the arm 334 to move toward or away from the bifurcated end 342, which is rotatably secured to the screw 326 and pinned to the lever 328. This vertical movement of the remote end of arm 334 will move the grippers 316 and 318 toward or away from each other.

Once the sensor 330 has indicated the presence of a jam, the microprocessor will cause a squeeze cylinder 344 to extend. Extension of this cylinder will cause the lever 328 to pivot clockwise about its connection to link 334. The remote end of arm 334 will be moved downward causing both of the arms 320 and 322 to swing toward each other. The grippers 316 and 318 will grip the ear which is between the rollers 54, 56 and 58. A retract cylinder 346 will then extend causing the slide member 350, to which cross members 329 and 330 are secured to be moved to the left. The grippers 316 and 318 will, therefore, assist the feed rollers 54, 56 and 58 in attempting to force the jammed ear through the cutter head 186, which is facilitated by the completely open knives, as explained previously. The microprocessor may be programmed to attempt this procedure more than once. A subsequent push sequence by the grippers 316 and 318 would be preceded by a contraction of the squeeze-clinder to spread the grippers, and then a contraction of the cylinder 346. Extension of the squeeze cylinder to grip the ear followed by an extension of the stroke cylinder would then provide a second effort at pushing the jammed ear through the fully opened knives of the cutter head. The microprocessor may be programmed to use the grippers to assist the feed rollers in pushing the jammed ear through the cutter head a predetermined number of cycles and having failed to clear the jam, to then reverse the motor 122, which reverses the direction of all components, the most critical being the feed roller 54, 56 and 58. With the feed rollers so reversed, the stroke cylinder is extended with the squeeze cylinder retracted, the squeeze cylinder then extended to grip the jammed ear and the stroke cylinder retracted to force the ear away from the cutter. When a jam signal is present, the cylinder 46 associated with the cutter unit experiencing the jam is extended to position the bar 52 across the associated opening 14, stopping the flow of ears to that cutter unit. Once the jam signal is no longer present, the cylinder 46 is retracted to permit ears to once again be dropped from the conveyor 12 for cutting.

A safety stop, as provided in FIG. 7, is provided to hold the feed rollers 58 open, i.e. spread apart, whenever the knives are open. This is to prevent the knives from cutting into the feed rollers 58 which are positioned as close to the knives as possible and would be contacted by the knives if the feed rollers 58 return to their normal position while the knives are open. When a jam occurs, as previously described, the roller 36 pushes the extension 338 upward causing the bell crank 252 to rotate counterclockwise pushing the arm 256 downward, the end of pawl 268 will engage the ratchet 269 to lock the bell cranks 250 and 252 and hence hold the rollers 58 apart. The spring 271 pulling up on the pawl 268, pivoting it about the roller 273 in its engagement with the top of arm 256, keeps the ratchet 269 in engagement with the end of pawl 268. The locked bell cranks 250 and 252 will remain latched and the rollers 58 held open, i.e. apart, until the knives close. When they close, the control wheels 238 are pushed away from the head 186 by the springs 232, acting through the ramp 230 and the cam 222, causing the plates 260 and 262 to rotate about the shaft 258. The rotation of plate 260 is transmitted to the arm 256 causing it to rotate counterclockwise, as viewed in FIG. 7. This movement of the arm 256 will raise the roller 273 causing the end of pawl 268 to disengage from the ratchet 269. The spring 254 will then return the bell cranks 250 and 252 to their normal position permitting the rollers 58 to also close to their normal position. Thus, the rollers 58 cannot close while the knives are open.

As shown in FIGS. 2, 3 and 13, the cob puller 170 is mounted on a carriage mechanism 400 which permits quick and easy installation and removal of the cutter head 186, for cleaning or mechanical servicing. The carriage includes a pair of side beams 402 and 404, with fore and aft extending grooves on their inner sides, a pair of flat bars 406 and 408 are bolted to the frame 401 of the cutter unit and extend toward and mate with the grooves, preferably, the bars are made of brass and the beams 402 and 404 of stainless steel so that a smooth sliding action is achieved by the beams 402 and 404 on the bars 406 and 408. The cross beam 264 is connected between the side beams 402 and 404. A manually actuated lever 412 is pivotally mounted on the frame 401 and has a rigid extension 414 thereon. A link 416 is pivoted at one end to the extension 414 and at the other to the side beam 404. When the lever 412 is pivoted from the position shown in FIG. 2 to that in FIG. 12 the extension 414 pulls on the link 416 and causes the side beams 402 and 404 to slide on the bars 406 and 408 to the left. To prevent binding the lever 412 may be secured to a shaft 411 which extends across the carriage and actuates a similar linkage; i.e. an extension similar to 414 is secured to the shaft 411 and pinned to a link similar to link 416 which link is in turn pinned to side beam 402. A link 418 is pivotally connected at 420 to the front of the side beam 404. The upper end of the link 418 is pivotally connected by pin 422 to a block 424 which is pinned by pin 425 to the arm 426 of a bell crank 428. The bell crank 428 is rotatably mounted on the frame 401 and has an arm 430 on which the pressure roller 194 is rotatably mounted. Movement of the carriage 400 outward causes the bell crank 428 to rotate the pressure roller 194 upward away from the cutter head 186. Since the shaft 258 and the plates 260 and 262 are supported on the cross beam 264, the control wheels 238 and 240 will be moved away from the adjusting cam 222, when the carriage 400 is moved outward. Similarly, the cob puller 170 and its rotating shafts, as well as the counter structure, are cantilevered from a stanchion 440 attached to cross member 264. Thus, the cob puller 170 will be extracted from the cutter head and all components secured to the cross member 264 will be moved away from the cutter head 186 when the carriage 400 is moved outward. The drive pulley 158 is not moveable with the carriage 400 and to accommodate the relative movement between that pulley 158 and the other pulleys 160 and 162, the idler pulley 164 is rotatably mounted on an arm 442 pivoted to the stanchion 440. As the carriage 400 is moved outward the idler pulley 164 can swing downward or counterclockwise as viewed in FIG. 13. A light tension spring 444 is connected between the stanchion 440 and a lug 446 formed on the pivot hub of the arm 442 in order to maintain the belt 156 properly seated in the pulleys 164, 162, 160 and 158 when the carriage 400 is in outward position. A compression spring 448 is trapped between an extension 450 and a retainer 452 attached to a bolt 454 slideably projecting through a hole in the extension 450. The retainer engages the frame 401 as the carriage 400 is moved inward compressing the spring 448. The force exerted by the spring 448 functions to provide the needed tension for the belt 156 during operation of the cutter unit. The normal force for the pressure roller 194 on the cutter head 186 is provided by two compression springs 456 interposed in the link 418. The link 418 has a plate 460 through which bolts 458 slideably pass to engage a block 462 pinned by pin 420 to the beam 404. The pressure roller swings down into contact with the cutter head 186 before the carriage has moved completely inward. The additional travel is accommodated by shortening the link 418 and compressing the springs 456. The force exerted by the compressed springs 456 provides sufficient normal force between the drive rollers 138 and 140 and the body 188 of the cutter head 186 to insure a friction drive therebetween. In order to lock the carriage 400 in its proper inward position, the pivotal connection of the link 416 and the extension 414 goes over center, i.e., past an aligned position of the link 416 and the extension 414, with a stop 470 secured to the frame 401 in the path of the extension 414 limiting the amount of over-center travel.

A cutter head rack 480 is attached to the front of the cutter unit to one side of the carriage and at a distance to clear the carriage 400 and to a stationary portion thereof. A bracket 482 is secured to the side cover 484 which has a tubular socket 486 attached to it. A U-shaped frame 488 has a pivot pin 490 secured thereto which pin is engageable with the socket 486 to permit at least some pivoting of the frame 488 about the axis of the pin 490. A grooved plastic roller 492 is rotatably attached to the frame 488 at about its bottom center and two similar roller 494 and 496 are rotatably mounted at the upper ends of the U-shaped frame 488. The two rollers 494 and 496 are equiangular spaced from the roller 492 and spaced apart to contact the head 186 just below its horizontal centerline. The grooves of the rollers 492, 494 and 496 engage the flange 192 of the head 186 and support and retain the cutter head. The rollers permit the head to be rotated for more efficient cleaning or inspection. The knives 208 project toward the cover 484 and are quite sharp. In order to reduce the possibility of contact with the knives, a shield 498 is positioned at the elevation of the knives and supported by bars 500.

A cob counter is also cantilevered from the stanchion 440 on a plate 600 bolted thereto. A vertical guide plate 604 is secured to the plate 600 and positioned on one side of the discharge from the cob puller 170. A pair of fingers 606 are secured to a tube 608 pivotally attached to the plate 604 by a pin 610. A lever 612 is attached to the tube and has a pin 614 extending through a slot 616 in the plate 604. A tension spring 618 is connected between the pin 614 and a pin 620 connected to the plate 604. The fingers 606 are positioned in the path of cobs as they are discharged by the cob puller and when contacted by the moving cobs will pivot the tube 608 and extend the spring 618. An arcuate indicator 622 is supported by an arm 624 attached to the tube 608. A sensor 626 senses the absence of the metal indicator 622 and thereby provides a count of the cobs processed by the cutter unit.

The cutter unit of this invention is capable of cutting kernels from the cob regardless of its orientation, i.e., either butt end first or tip end first. This is accomplished by the manner in which the final set of rollers 58 sense the diameter of each ear and adjust the knives just before the ear is pushed into the knives. The knives also contribute by having their cutting edges angled away from the cob so that the inside flat surface of the knife may, to some degree, ride and guide on the cob itself. Each of the knives also has a short bevel which permits the knives to ride both uphill to cut from the tip end or downhill to cut from the butt end.

While a preferred embodiment of the present invention has been shown and described herein, it is to be understood that various changes and modifications may be made therein without departing from the spirit of the invention as defined by the scope of the appended claims.

What is claimed is:
1. A corn cutter unit comprising:
a rotating head;
a plurality of knives arranged on said head;
a plurality of feed rollers for propelling ears of corn toward said knives; and
a cob puller having upper and lower chains formed of links; a sprocket for driving each chain and a guide for each chain having a height substantially equal to the length of said individual links.
2. The invention according to claim 1, and further comprising;
a cylindrical guide for assuring the cobs are maintained between said chains.
3. The invention according to claim 1, wherein said chains engage the cob before the ear protrudes from the head on the side opposite the knives.

* * * * *